No. 729,864. PATENTED JUNE 2, 1903.
F. W., A. G. & E. A. HOEFER.
WIRE GAGING AND CUTTING MACHINE.
APPLICATION FILED JAN. 21, 1903.
NO MODEL. 5 SHEETS—SHEET 1.
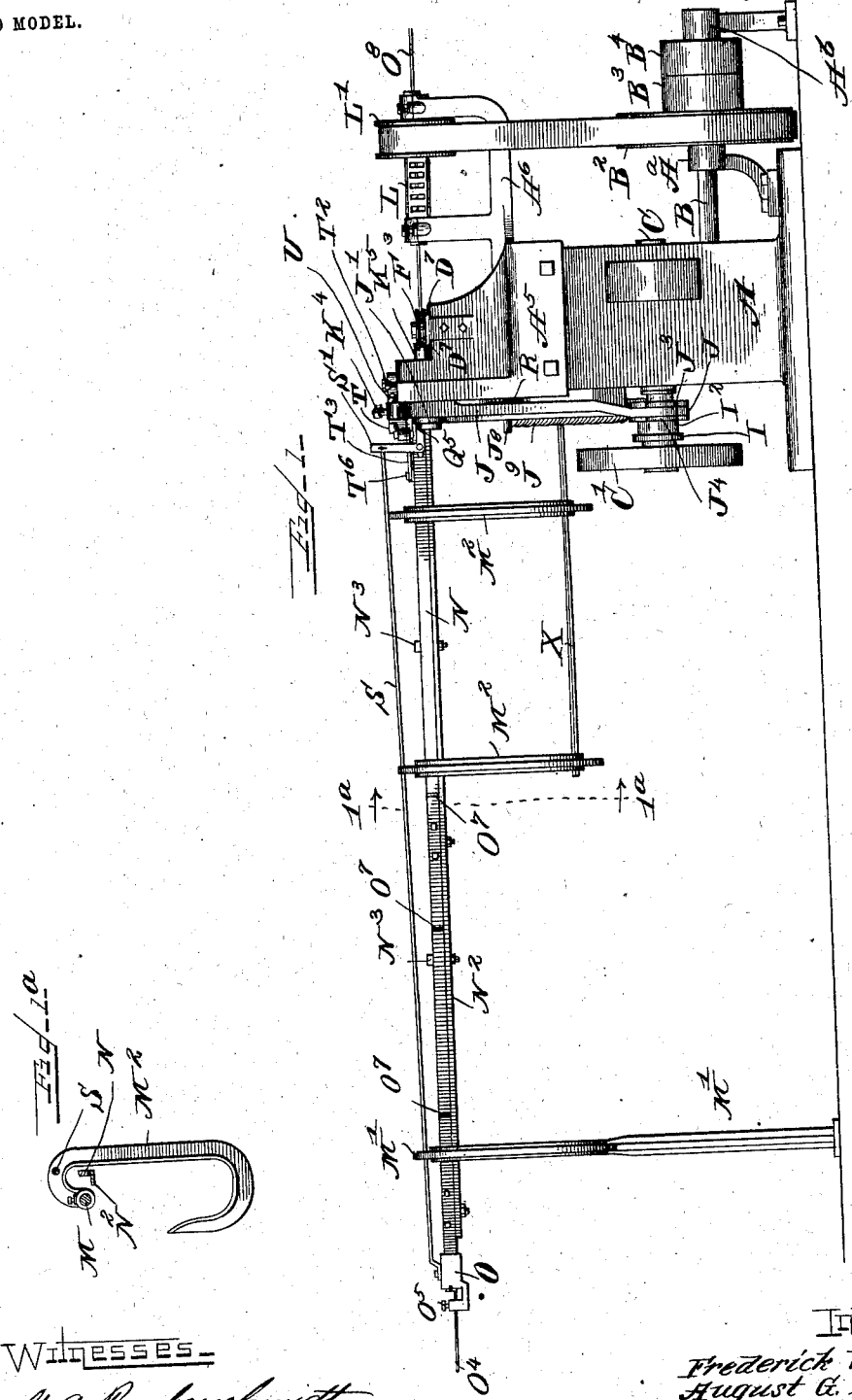
Witnesses:
G. A. Raubenschmidt
Frank A. Ticknor.
Inventors:
Frederick W. Hoefer,
August G. Hoefer,
Emil A. Hoefer,
By  Morrison Atty.

No. 729,864. PATENTED JUNE 2, 1903.
F. W., A. G. & E. A. HOEFER.
WIRE GAGING AND CUTTING MACHINE.
APPLICATION FILED JAN. 21, 1903.
NO MODEL. 5 SHEETS—SHEET 2.
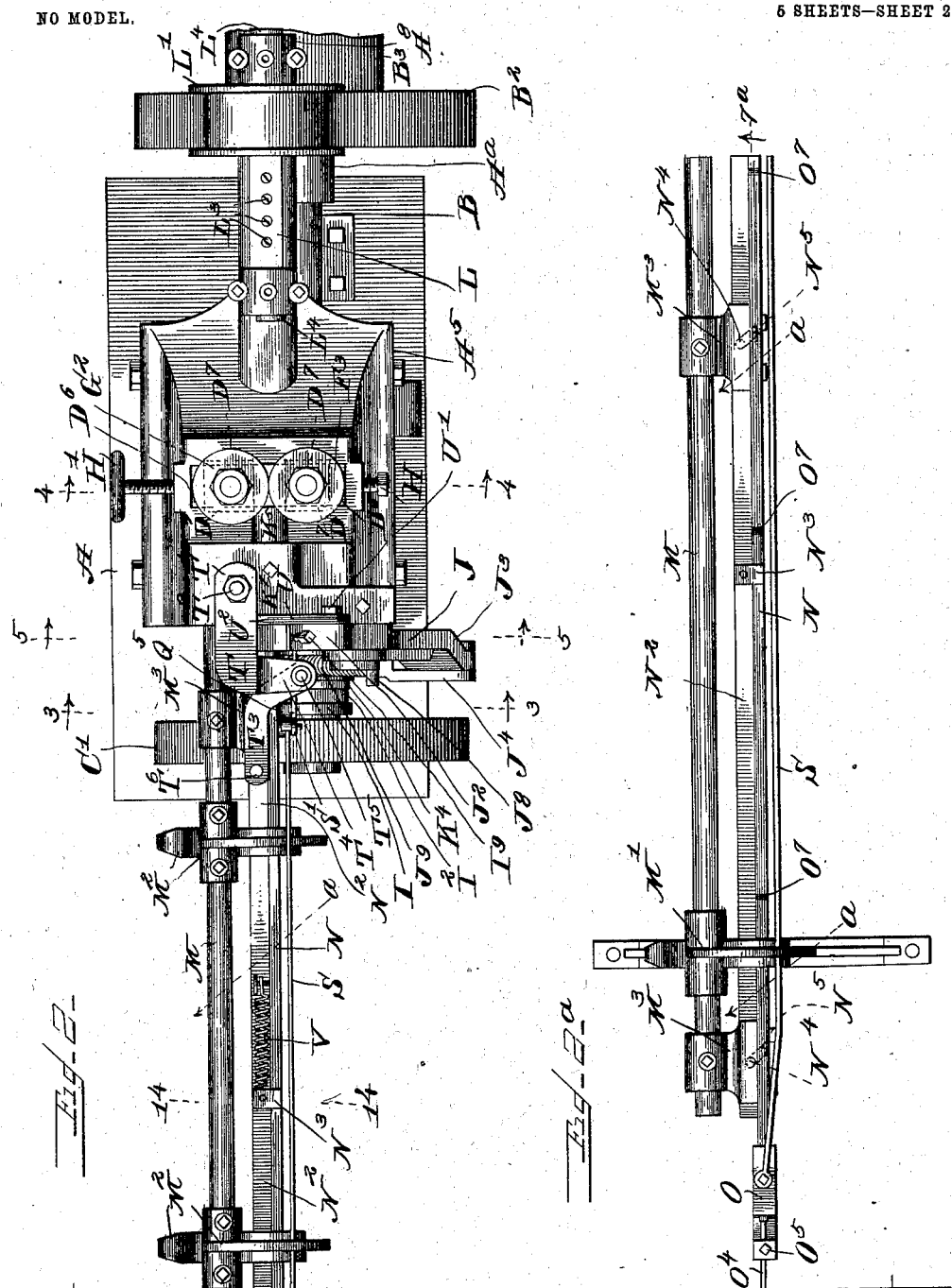

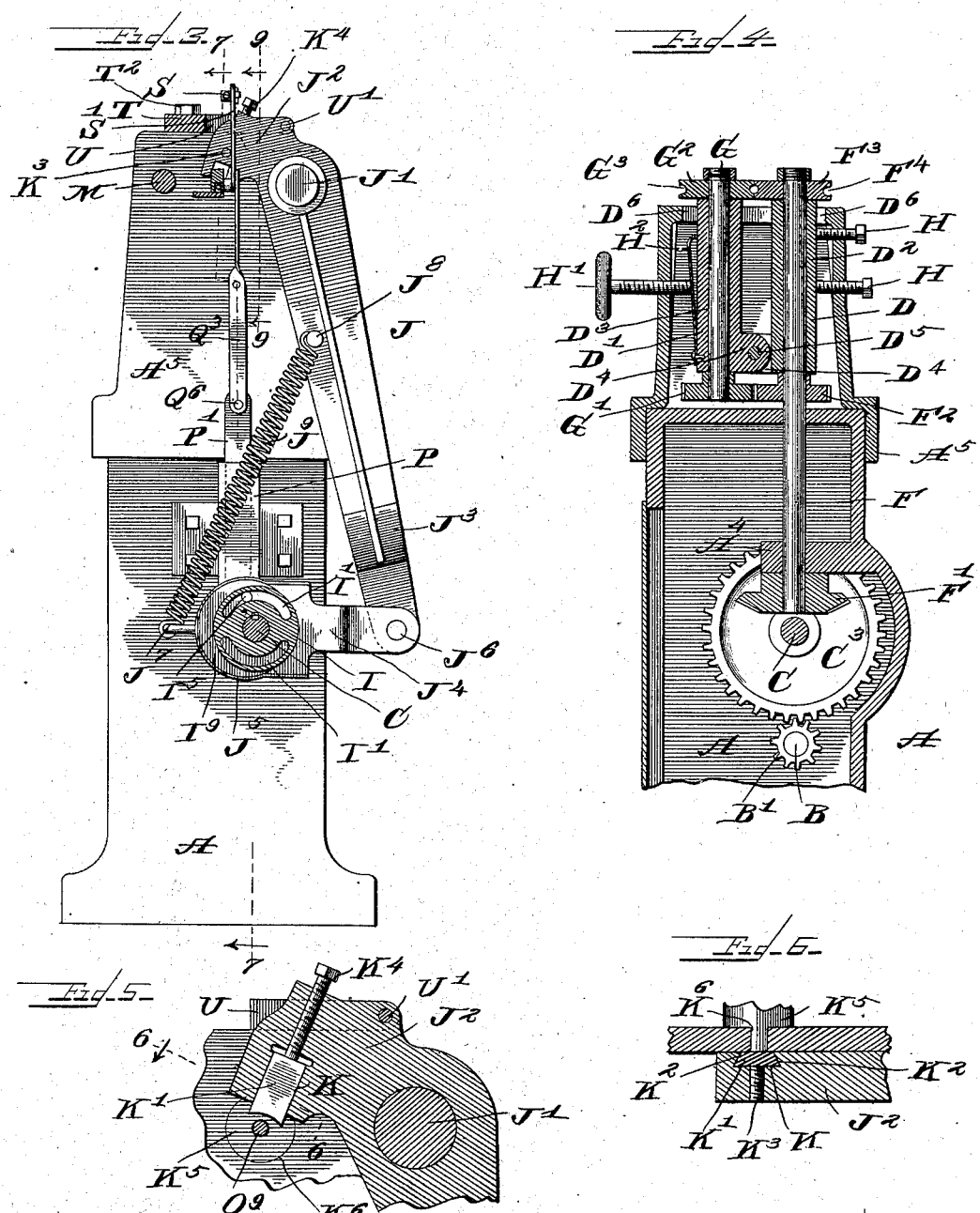

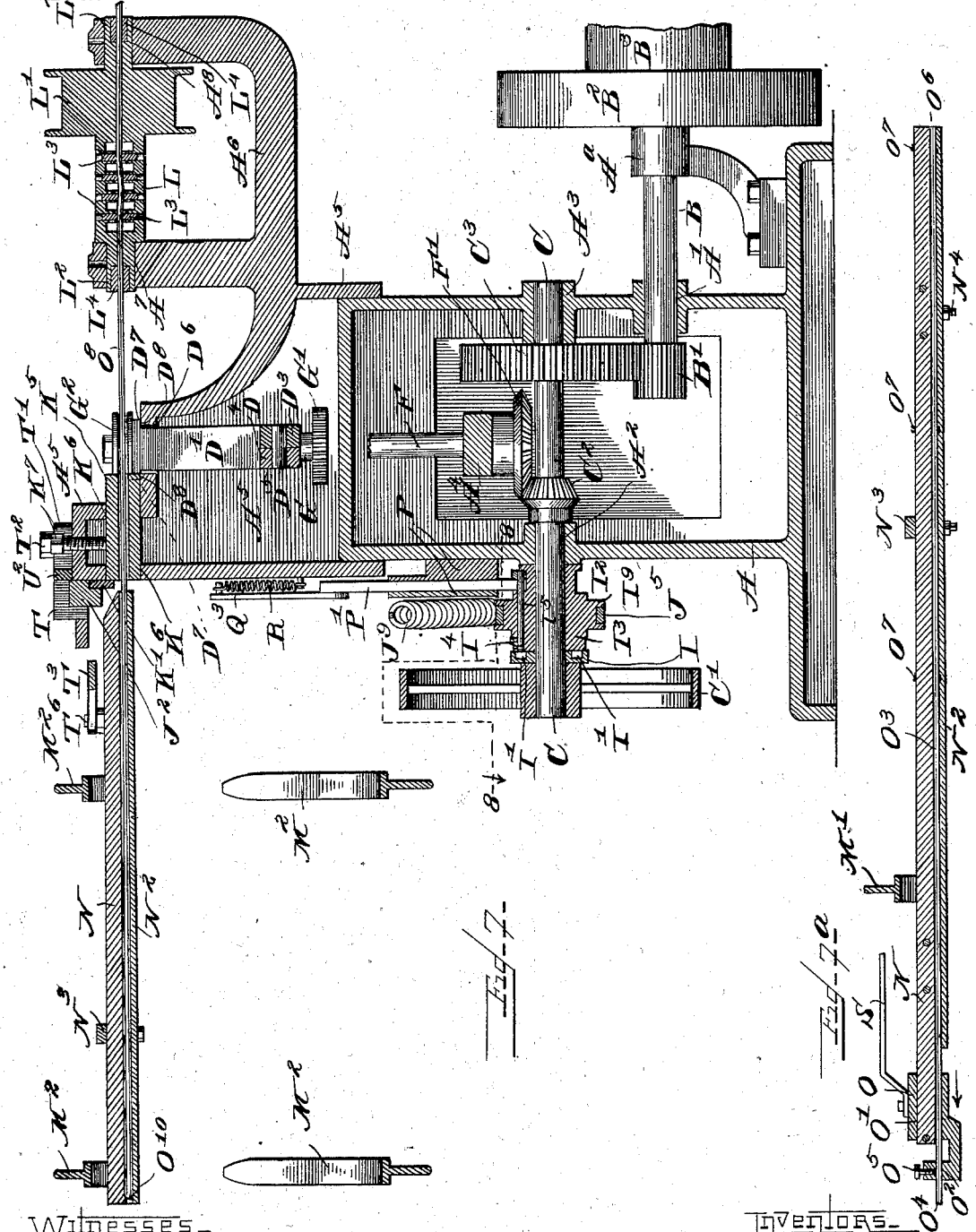

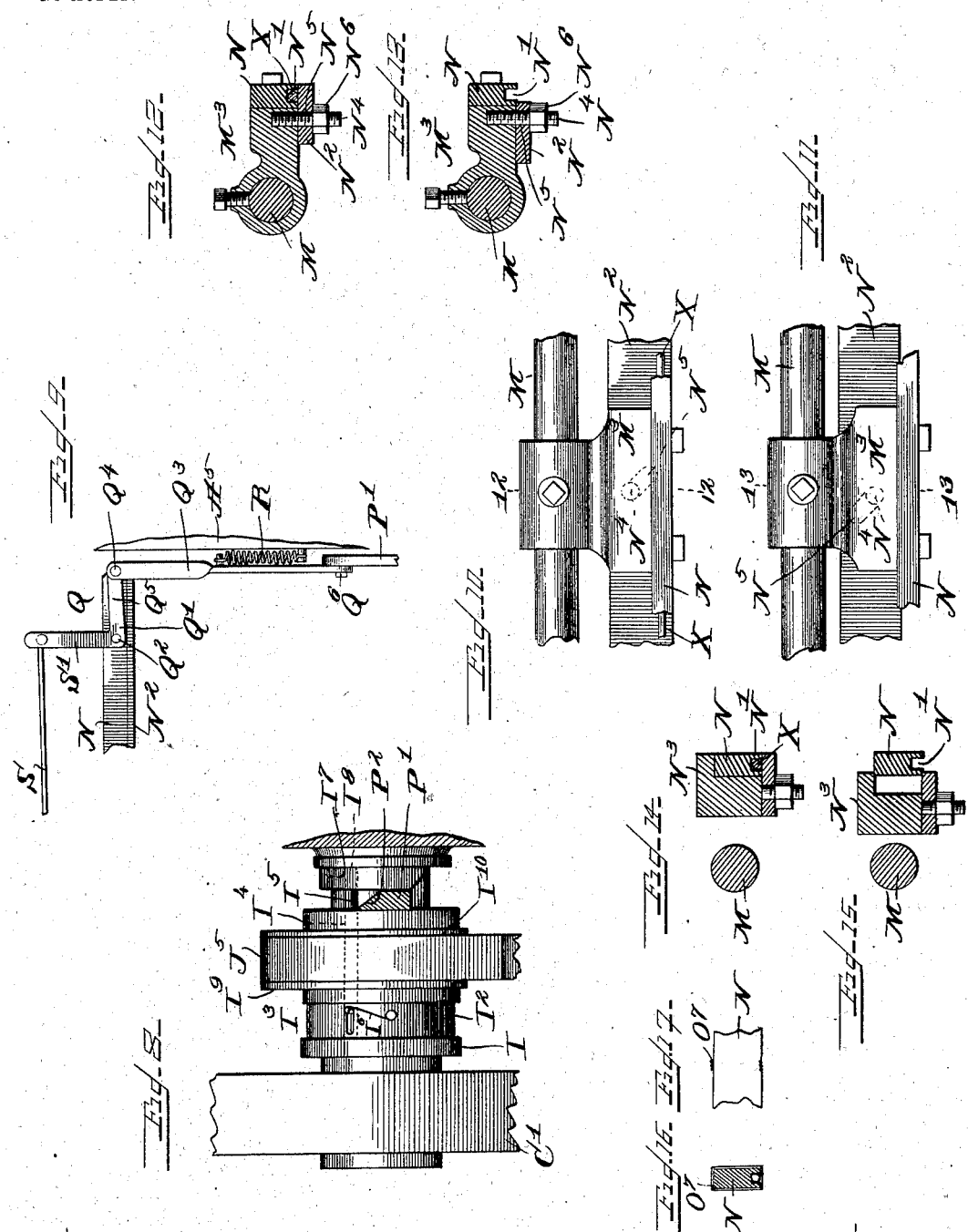

No. 729,864. Patented June 2, 1903.

UNITED STATES PATENT OFFICE.

FREDERICK W. HOEFER, AUGUST G. HOEFER, AND EMIL A. HOEFER, OF FREEPORT, ILLINOIS, ASSIGNORS TO HOEFER MANUFACTURING COMPANY, OF FREEPORT, ILLINOIS, A CORPORATION OF ILLINOIS.

WIRE GAGING AND CUTTING MACHINE.

SPECIFICATION forming part of Letters Patent No. 729,864, dated June 2, 1903.

Application filed January 21, 1903. Serial No. 140,050. (No model.)

*To all whom it may concern:*

Be it known that we, FREDERICK W. HOEFER, AUGUST G. HOEFER, and EMIL A. HOEFER, citizens of the United States of America, residing at Freeport, in the county of Stephenson and State of Illinois, have invented certain new and useful Improvements in Wire Gaging and Cutting Machines, of which the following is a specification.

Our invention relates to improvements in wire gaging and cutting machines which are adapted to measure off and sever segments of predetermined lengths from a continuous wire; and it consists of certain new and useful features of construction and combinations of parts especially devised to those ends, all as hereinafter fully described, and specifically pointed out in the claims.

Referring to the accompanying drawings, which form a part of this specification, Figure 1 is a side elevation of a machine embodying our invention. Fig. 1$^a$ is a section at the dotted line 1$^a$ 1$^a$ in Fig. 1 of parts there shown. Fig. 2 and Fig. 2$^a$ are a top plan view of the machine sectioned through the dotted line 1$^a$ 1$^a$ in Fig. 1. Figs. 3, 4, and 5 are sections at the dotted lines 3 3, 4 4, and 5 5, respectively, in Fig. 2 of parts there shown. Fig. 6 is a section at the dotted line 6 6 in Fig. 5 of parts there shown. Fig. 7 is a section at the dotted line 7 7 in Fig. 3 of that part of the machine shown in Fig. 2. Fig. 7$^a$ is a section at the dotted line 7$^a$ 7$^a$ in Fig. 2$^a$ of parts there shown. Fig. 8 is an enlarged detailed view of parts of the machine as seen when looking in the direction indicated by the arrow in Fig. 7, other parts thereof being sectioned away at the dotted line 8 8 thereon. Fig. 9 is a detailed side view of parts shown in Fig. 3, other parts being there sectioned away at the dotted line 9 9 thereon. Fig. 10 is an enlarged detailed view of parts shown in Fig. 2$^a$. Fig. 11 is a like view of the same with parts thereof in different relative positions. Fig. 12 is a section at the dotted line 12 12 in Fig. 10 of parts there shown. Fig. 13 is a section at the dotted line 13 13 in Fig. 11 of parts there shown. Fig. 14 is a section at the dotted line 14 14 in Fig. 2 of parts there shown. Fig. 15 is a like view of the same with parts thereof in different relative positions. Figs. 16 and 17 are broken details of parts of the machine.

Like letters of reference indicate corresponding parts throughout the several views.

A is the lower section of the main frame of the machine and is preferably substantially rectangular in form and hollow and has circular bearings A', A$^2$, A$^3$, and A$^4$ therein. A$^5$ is the upper section of such main frame and supports a preferably integral horizontal arm A$^6$, having circular bearings A$^7$ A$^8$ therein.

B is a shaft mounted in the bearings A' A$^a$ A$^b$ and carrying a pinion B', a large belt-pulley B$^2$, and a small belt-pulley B$^3$, all fast thereto, and a loose belt-pulley B$^4$.

C is a shaft mounted in the bearings A$^2$ A$^3$, and carrying a balance-wheel C', a bevel-pinion C$^2$, and a gear-wheel C$^3$, all fast thereto, meshing with the pinion B'.

D D', Fig. 4, are vertically-elongated blocks having circular bearings D$^2$ D$^3$ extending longitudinally therethrough and hinged together at their lower ends by means of lugs D$^4$ D$^4$ thereon and a pintle D$^5$ extending transversely through such lugs and suspended through an opening D$^6$ in the main frame by means of flanges D$^7$, Figs. 2 and 7, projecting laterally therefrom into engagement with bearings D$^8$ on such main frame.

F is a shaft mounted in the bearings A$^4$ D$^2$ and carrying a bevel-gear F', meshing with the bevel-pinion C$^2$, and having a pinion F$^2$ and a wire-feeding roll F$^3$, having a groove F$^4$ in the periphery thereof.

G is a shaft mounted in the bearing D$^3$ and carrying a pinion G', meshing with the pinion F$^2$, and a wire-feeding roll G$^2$, having a groove G$^3$ in the periphery thereof and adapted to coöperate with its counterpart roll F$^3$.

H H' are set-screws for regulating the pressure of the rolls F$^3$ G$^2$ against a wire passing between their peripheries.

H$^2$ is a powerful spring interposed between the set-screw H' and block D' to render the pressure of the wheels F$^3$ G$^2$ a yielding one.

I, Figs. 3, 7, and 8, is a female clutch member consisting of a wheel having a plurality of transverse engaging sockets I' sunk into the inner face thereof and is fast to the shaft C.

I$^2$, Figs. 7 and 8, is a male clutch member consisting of a hub I$^3$, mounted loose on the shaft C, having a slideway I$^4$ extending longitudinally therethrough and registering with the counterpart engaging sockets I' in the member I and a pin I$^5$ inserted through and adapted to be slid endwise in such slideway I$^4$ into and out of engagement with such sockets I'.

I$^6$, Fig. 8, is a spring mounted on the hub I$^3$ and normally impelling the pin I$^5$ into and retaining it in engagement with one of the sockets I' in the member I.

I$^7$ is a cam-head on the end I$^8$ of the pin I$^5$, whereby such pin I$^5$ may be thrown out of engagement with the female clutch member I at predetermined times by means to be described hereinafter.

I$^9$, Figs. 3, 7, and 8, is an eccentric preferably integral with and projecting radially from the hub I$^3$ of the male clutch member I$^2$ and having a connecting-groove I$^{10}$ sunk into the periphery thereof.

J, Fig. 3, is a cutter-bar mounted, by means of a pivot-bearing J' extending transversely therethrough, on the main frame of the machine, so as to leave a short arm J$^2$ above and a long arm J$^3$ below.

J$^4$ is a pitman connected, by means of an eccentric-hoop J$^5$, with the eccentric I$^9$ and by means of a pivot-joint J$^6$ with the free end of the long arm J$^3$ of the cutter-bar J.

J$^7$ J$^8$ are studs projecting from the eccentric-hoop J$^5$ and the cutter-bar J, respectively, and J$^9$ is a tension-spring constantly tending to draw the parts connected thereby toward each other. The function of the spring J$^9$ is to assist in supporting and steadying the parts composing the clutch member I$^2$.

K, Fig. 5, is a dovetailed slot in the free end of the arm J$^2$ of the cutter-bar J for the reception of a counterpart dovetailed cutter K'. Such cutter K' is firmly secured in the slot K by forcing the edges thereof against the dovetailed edges K$^2$, Fig. 6, of such slot K by means of the set-screw K$^3$. The cutter K' is also supported longitudinally by means of the set-screw K$^4$.

K$^5$ is a tubular cutter-plug of hardened steel longitudinally adjustable with reference to the cutter K' and firmly secured in circular bearings K$^6$, Figs. 5 and 7, in the main frame of the machine by means of a set-screw K$^7$.

L L', Fig. 7, are a longitudinally centrally-bored revoluble head and pulley, preferably integral, provided with axes L$^2$, mounted in the bearings A$^7$ A$^8$ in the part A$^6$ and furnished with the usual straightening-dies L$^3$, seated in the head L, and having tubular hardened steel conducting-plugs L$^4$, seated in the ends of the axes L$^2$.

M is a supporting-rail mounted horizontally in the main frame of the machine and in the upper end of the standard M', Figs. 1 and 2$^a$, the upper end of such standard M' being of the same form in side elevation as the hook shown in Fig. 1$^a$.

M$^2$ represents receiving-hooks mounted on and depending from the rail M.

M$^3$ represents brackets mounted horizontally and rigidly on the rail M.

N is a longitudinally-grooved guide rigidly secured to the brackets M$^3$ and with the groove N' therein preferably opening downward.

N$^2$ is a guide-closure and is normally slidably suspended immediately below and from the guide N thereon by means of the rigid lugs N$^3$ and by means of the bolts N$^4$, projecting downward from the brackets M$^3$ through the oblique slots N$^5$ in such closure and the nuts N$^6$ applied to the lower ends of such bolts N$^4$.

O is a gage-carriage having a rectangular passage O', Fig. 7$^a$, extending longitudinally therethrough to admit the guide N, whereon it is slidably mounted and provided with an opening O$^2$ in the rear portion thereof to admit a part to be described hereinafter.

O$^3$, Fig. 7$^a$, is a gage which is most conveniently formed of a segment of wire, having its outer end O$^4$ inserted through the opening O$^2$ in the carriage O, whereinto it is secured by means of a set-screw O$^5$, and its inner end O$^6$ slidably retained within the groove N' in the guide N by means of ties O$^7$, preferably formed of pieces of fine wire passed and secured by twisting the ends thereof together around the guide N and below such gage O$^3$.

The distance between the operative end of the cutter-plug K$^5$, Figs. 5, 6, and 7, and the inner end O$^6$, Fig. 7$^a$, of the gage O$^3$ will exactly determine and measure the length of each segment of wire X severed from the line of wire O$^8$ by the cutter K' of the machine. Obviously, therefore, the farther the gage O$^3$ is set into the groove N' in the guide N the shorter such segments X of wire will be, and vice versa. In practice it will also often be found convenient to provide gages of different lengths.

P, Figs. 3 and 7, is a vertical detent-slideway fast to the machine-frame.

P' is a detent having a cam-surface P$^2$, Fig. 8, on one edge thereof and slidably mounted in the slideway P.

Q, Fig. 9, is a bell-crank mounted at its angle Q' on a pivot-bearing Q$^2$ on the part N.

Q$^3$ is a link connected, by means of a pivot-joint Q$^4$, with the free end of the horizontal arm Q$^5$ of the bell-crank Q and by means of a pivot-joint Q$^6$ with the upper end of the detent P'.

R is a tension-spring connecting the link Q$^3$ with the part A$^5$ of the machine-frame and normally acting through such link Q$^3$ to force the detent P' down into and retain it in engagement with the cam-head I$^7$ on the slidable pin I$^5$.

S is a wire link connecting the free end of the vertical arm S' of the bell-crank Q with the gage-carriage O.

T, Fig. 2, is a bell-crank mounted at the end of one of its arms T' on a pivot-bearing T² on the part A⁵ of the machine-frame.

T³ is a link connecting the free end of the arm T⁴ of the bell-crank T, by means of the pivot-joint T⁵, with the closure N² of the guide N by means of the pivot-joint T⁶.

U is an arm mounted by one end on a pivot-bearing U' at the upper end of the cutter-bar J and having its free end U² projecting against or into close proximity to the central portion of the arm T' of the bell-crank T.

V, Fig. 2, is a tension-spring connecting the closure N² with the longitudinally-grooved guide N and normally retaining such closure shut under such guide, Fig. 10.

At each oscillation of the cutter-bar J to sever a segment of wire, as X, the free end U² of the arm U will be forced forward against the arm T' of the bell-crank T, thereby causing the free end of the arm T⁴ of such bell-crank to swing toward T⁶ and communicate motion through the link T³ to the closure N², which will be thereby slid against the action of the spring V in an oblique direction, as indicated by the arrows $a$ in Figs. 2 and 2ª, from the position shown in Fig. 10 to that shown in Fig. 11, thus opening the closure N² and permitting a wire segment, as X, to drop by gravity out of the groove N' in the guide N into the receiving-hooks M².

The machine is operated in the following manner: A continuous line of wire O⁸ extends from a coil on a reel (not shown) through the straightening-dies L³ in the revoluble head L between the feeding-rolls F³ G², which drives such line of wire O⁸ through the cutter-plug K⁵ and into and along the groove N' in the guide N until the end O¹⁰ thereof, Fig. 7, strikes the end O⁶, Fig. 7ª, of the gage O³. The gage O³ and its carriage O will be forced along by such moving line of wire O⁸ in the direction indicated by the arrow in Fig. 7ª until motion communicated from such carriage O through the bell-crank Q and link Q³ to the detent P' slides the latter upward out of engagement with the cam-head I⁷ of the pin I⁵ when the spring I⁶ will force such pin I⁵ into one of the engaging sockets I' in the female clutch member I, which being in constant rotation will turn the male clutch member I² and its eccentric I⁹ once around. The single turn of the eccentric I⁹, just described, acting through the pitman J⁴ will oscillate the cutter-bar J and cause its cutter K' and the cutter-plug K⁵ to sever a segment of wire X, which will be released from and pass out of the groove N' in the guide N into the receiving-hooks M² in the manner already described. Instantly after the severance of the segment of wire X, which operation simultaneously released the guide-closure N², the detent P', gage-carriage O, and its gage O³, the spring V will shut the closure N², Fig. 10, and the spring R will return the gage-carriage O and its gage O³ to their original positions, Figs. 1 and 7ª, and will also force the detent P' downward against the male clutch member J², Fig. 7, by which time the latter will have turned a little less than one revolution, whereupon the cam-surface P² thereon will engage the cam-head I⁷ on the pin I⁵ and therethrough withdraw the latter from engagement with the engaging socket I' in the female clutch member I, the male clutch member I² continuing to turn until the pin I⁵ strikes the edge of the cam-surface P² of the detent P' and stops the further rotation of such member I². The continuously-moving line of wire O⁸ will again in due course strike the end O⁶ of the gage O³, and the series of operations hereinbefore described will be repeated and another segment of wire X will be severed and drop into the receiving-hooks M².

We claim as new and desire to secure by Letters Patent—

1. In a wire gaging and cutting machine, in combination, a longitudinally-grooved guide—the groove therein preferably opening downward—a guide-closure slidably suspended immediately below the guide, a slidably-mounted gage-carriage, and a gage secured in the gage-carriage and extending therefrom into and slidably retained in the groove in the guide, substantially as and for the purpose specified.

2. In a wire gaging and cutting machine, in combination, a longitudinally-grooved guide—the groove therein preferably opening downward—a guide-closure slidably suspended immediately below the guide, a gage-carriage slidably mounted on the guide, and a gage secured in the gage-carriage and extending therefrom into and slidably retained in the groove in the guide and means for operating the guide-closure and gage-carriage, substantially as and for the purpose specified.

3. In a wire gaging and cutting machine, in combination, a longitudinally-grooved guide—the groove therein opening downward—a guide-closure slidably suspended below the guide, a gage-carriage slidably mounted on the guide, a gage secured in the gage-carriage and extending therefrom into and slidably retained in the groove in the guide, a mounted clutch, a detent normally holding the clutch members out of engagement, and the link and intervening bell-crank connections between such gage-carriage and detent, substantially as and for the purpose specified.

4. In a wire gaging and cutting machine, in combination, a supporting-frame, a longitudinally-grooved guide, a guide-closure slidably suspended below the guide, a gage-carriage slidably mounted on the guide, a gage secured in the gage-carriage and extending therefrom into and slidably retained in the groove in the guide, a mounted clutch consisting of a male and a female member, a detent normally holding said clutch members out of engagement, a pivotally-mounted cutter-bar, a pitman connecting an eccentric on the male clutch member with a pivot-bearing on the lower end of the cutter-bar, the bell-crank and link connections between the gage-carriage and detent and between the guide-closure and the supporting-frame, and means, carried by the cutter-bar, for opening the guide-closure, substantially as and for the purpose specified.

5. In a wire gaging and cutting machine, in combination, a main frame, a tubular cutter-plug longitudinally adjustable in bearings in the frame, a cutter-bar, pivotally mounted on the frame and having a dovetailed slot in the free end thereof, a dovetailed cutter and means for securing the cutter in the slot in the cutter-bar—by forcing the dovetailed edges of such cutter against the corresponding dovetailed edges of the slot in the cutter-bar and by longitudinally supporting such cutter therein, substantially as and for the purpose specified.

6. In a wire gaging and cutting machine, in combination, vertically-elongated blocks D D' having circular bearings extending longitudinally therethrough and hinged together— for adjustment—at their lower ends, shafts F G mounted in the bearings in the blocks D D', pinions, mounted on the shafts F G and intermeshing, feeding-rolls mounted on the shafts F G and adapted to coöperate to feed wire into the machine, means for driving the shafts F G, a frame for supporting all of said parts and means for adjusting said blocks D D', substantially as and for the purpose specified.

In testimony whereof we have signed our names to this specification in the presence of two subscribing witnesses.

FREDERICK W. HOEFER.
AUGUST G. HOEFER.
EMIL A. HOEFER.

Witnesses:
L. L. MORRISON,
JESSIE E. VALENTINE.